(12) United States Patent
Daley

(10) Patent No.: US 9,519,299 B2
(45) Date of Patent: Dec. 13, 2016

(54) VOLTAGE REGULATOR FOR A POWER DISTRIBUTION SYSTEM AND METHOD OF CONTROLLING SAME

(71) Applicant: COOPER TECHNOLOGIES COMPANY, Houston, TX (US)

(72) Inventor: Daniel Joseph Daley, Waukesha, WI (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 0 days.

(21) Appl. No.: 14/755,014

(22) Filed: Jun. 30, 2015

(65) Prior Publication Data

US 2016/0041568 A1 Feb. 11, 2016

Related U.S. Application Data

(60) Provisional application No. 62/033,372, filed on Aug. 5, 2014.

(51) Int. Cl.
| | |
|---|---|
| *G05F 1/147* | (2006.01) |
| *G05F 1/14* | (2006.01) |
| *H02J 3/12* | (2006.01) |

(52) U.S. Cl.
CPC ............. *G05F 1/147* (2013.01); *G05F 1/14* (2013.01); *H02J 3/12* (2013.01)

(58) Field of Classification Search
CPC ............ G05F 1/14; G05F 1/147; G05F 1/153; G05F 1/16; G05F 1/20; G05F 1/253; G05F 1/30; H01F 29/02; H01F 29/04; H01H 9/0005
See application file for complete search history.

(56) References Cited

U.S. PATENT DOCUMENTS

| | | | |
|---|---|---|---|
| RE31,325 E | * | 7/1983 | Crapo ....................... G05F 1/30 323/263 |
| 5,450,002 A | | 9/1995 | Dunk |
| 5,537,030 A | | 7/1996 | Snodgrass et al. |

(Continued)

OTHER PUBLICATIONS

Jauch, E.T., "Maximizing Automatic Reverse Power Operations with LTC Transformers & Regulators", Power Engineering Society Inaugural Conference and Exposition in Africa, 2005 IEEE, IEEE, Piscataway, NJ, USA, Jul. 11, 2005, pp. 449-454.

(Continued)

*Primary Examiner* — Gary L Laxton
(74) *Attorney, Agent, or Firm* — Eckert Seamans; Philip Levy

(57) ABSTRACT

A method of controlling a voltage regulator having a nominal input and a nominal output structured to operate in a forward power mode wherein power flows from the input to the output and a reverse power mode wherein power flows from the output to the input. The method includes sensing current flowing through the voltage regulator, determining a direction of power flow through the voltage regulator based on the sensed current, determining a verified direction of power flow through the voltage regulator by altering a voltage between the input and the output and analyzing an effect caused thereby on at least one of a voltage at the input and a voltage at the output, and selecting a voltage regulating scheme for controlling the voltage regulator based on the verified direction of power flow.

20 Claims, 4 Drawing Sheets

(56) References Cited

U.S. PATENT DOCUMENTS

| | | | |
|---|---|---|---|
| 5,545,971 A * | 8/1996 | Gomez | H02M 5/12 |
| | | | 323/259 |
| 8,519,681 B2 | 8/2013 | Mathewson | |
| 2010/0045246 A1 | 2/2010 | Bryant et al. | |
| 2012/0206115 A1* | 8/2012 | Mathewson | G05F 1/14 |
| | | | 323/257 |
| 2015/0185743 A1 | 7/2015 | McFetridge et al. | |
| 2015/0295498 A1* | 10/2015 | Crane | H02M 3/33507 |
| | | | 363/21.01 |
| 2015/0301538 A1* | 10/2015 | Panosyan | G05F 1/20 |
| | | | 323/343 |

OTHER PUBLICATIONS

Colopy, C. et al., "Proper Operation of Step Voltage Regulators in the Presence of Embedded Generation", 5th International Conference & Exhibition on Electricity Distribution Electric Power Distribution Engineering [Online], Jun. 1, 1999-Jun. 4, 1999, pp. 1-6, URL:http://www.cired.net/publications/cired1999/papers/4/4_6.pdf [retrieved on Aug. 28, 2015].

Bassett, D. et al., "IEEE SCC21 1547 Series Standards Development P1547.8 Working Group Resource Document (WGRD) version1", Dec. 10, 201, 91 pp.

European Patent Office, "International Search Report and Written Opinion", PCT/US2015/038288, Sep. 7, 2015, 15 pp.

Taskin, S. "Power Plants Monitoring for Reverse Power Flow Evaluation", Istanbul University—Journal of Electrical & Electronics Engineering, 2010, vol. 10, No. 1; Department of Electronics and Automation, Celal Bayar University, Turgutlu-Manisa, Turkey, Recieved Date Dec. 12, 2008, Accepted Date: Aug. 24, 2009, pp. 1153-1162.

\* cited by examiner

VOLTAGE REGULATOR FOR A POWER DISTRIBUTION SYSTEM AND METHOD OF CONTROLLING SAME

CROSS REFERENCE TO RELATED APPLICATION

This application claims the benefit of U.S. Provisional Patent Application Ser. No. 62/033,372, filed Aug. 5, 2014, which is incorporated by reference herein.

BACKGROUND

Field

The disclosed concept pertains generally to voltage regulators used to stabilize the voltage being supplied in a power distribution system, and, more particularly, to a voltage regulator and method of controlling same that is able to accommodate the blending of a forward cogeneration mode of operation and a reverse power flow mode of operation due to system reconfiguration.

Background Information

The power distribution industry uses systems comprising a network of power lines to distribute electrical power to homes and businesses. In these power distribution systems, it is important that the electrical power be supplied continuously and at a stable voltage level. If the supply of power is not stable and continuous, then consumers will experience problems such as flickering lights and the malfunction of electrical equipment such as computers.

One problem that power companies face in trying to consistently supply stable and continuous power results from the fact that the electrical loads of their consumers are constantly changing. In particular, increased electrical loads on a power distribution system will have the tendency to reduce the voltage level of the supplied power. Likewise, decreased electrical loads on a power distribution system will tend to increase the voltage level of the supplied power.

To compensate for the changing voltage levels caused by changes in electrical load, power companies employ voltage regulating equipment to raise the voltage level in response to an increase in load and to decrease the voltage level in response to a decrease in load. A voltage regulating device is a power quality device that provides a stable output voltage despite fluctuations in an input voltage. A common type of voltage regulating device is what is known as a transformer equipped with a load tap changer (LTC), typically located at distribution substations. Step voltage regulators, an autotransformer, may also be used in distribution substations and also on single power line feeders. For example, if an input voltage fluctuates between 110 VAC and 130 VAC, the voltage regulating device maintains the output voltage at a constant 120 VAC. The voltage regulating device operates by comparing the actual output voltage (which is either measured directly or calculated) to a fixed reference voltage set point (a user-defined setting). The reference voltage set point is typically stored within a voltage regulator control unit, which controls operation of the voltage regulator. The voltage regulator control unit determines the difference between the actual output voltage and the reference voltage set point and uses this difference to control a regulating element. The regulating element is typically a tap changer that establishes and varies as needed the winding ratio between a primary and a secondary transformer winding, or a series and shunt winding (in the case of a step voltage regulator). A motor controls a position of the tap changer, and operating the tap changer changes the winding ratio and thus output voltage. The voltage regulator control unit controls the position of the tap changer to reduce the difference between the regulator output voltage and the set point to a value within a user-defined bandwidth, typically between about 1 and 6 volts.

Evolving applications on utility distribution grids have increased the complexity of the required functionality of a voltage regulator control where two distinct modes of operation, namely cogeneration and reverse power flow due to system reconfiguration, can be required out of the same connected and configured devices. This is illustrated with reference to FIGS. 1 and 2. More specifically, FIG. 1 shows an electrical distribution system 1 in a normal bus configuration having a first feeder circuit 2A and a second feeder circuit 2B. As seen in FIG. 1, feeder circuit 2A is fed from a voltage supply (e.g., a substation) 3A and a normally closed switch 4A in order to feed a number of loads 5A and a critical load center 6A. Also connected to feeder circuit 2A is generator 7, which may be a distributed source such as a wind turbine or a PV (photo voltaic) module. Feeder circuit 2B is fed through a voltage supply 3B and a normally closed switch 4B in order to feed a number of loads 5B and a critical load center 6B. Feeder circuit 2A and feeder circuit 2B are separated from one another by a normally open switch 8. Voltage supplies 3A and 3B may be fed from the same or different electrical substations.

Voltage regulators 9A and 9B are located on respective feeders 2A and 2B to support voltage regulation downstream on the feeder. FIG. 2 shows electrical distribution system 1 in a condition wherein it has been reconfigured into a back fed bus configuration. In this configuration, normally closed switch 4A is opened in order to remove voltage supply 3A from service, and normally open switch 8 is closed. As a result, feeder circuit 2B and feeder circuit 2A will both be fed by voltage supply 3B.

In the system configuration as shown in FIG. 2, a normally prescribed method of Cogeneration operation can and will cause the Voltage Regulator to actually drive the controlled voltage in the opposite direction of that which is needed to regulate voltage to loads downstream of the Voltage Regulator in this reverse power flow scenario.

No current method of operating and/or controlling a voltage regulator exists that is capable of accommodating the blending of a cogeneration mode of operation and a reverse power flow due to system reconfiguration mode of operation. There is thus a need for a voltage regulator and method of controlling same that is able to accommodate the blending of these two distinct modes of operation.

SUMMARY

In one embodiment, a method of controlling a voltage regulator having a nominal input and a nominal output structured to operate in a forward power mode wherein power flows from the input to the output and a reverse power mode wherein power flows from the output to the input is provided. The method includes sensing current flowing through the voltage regulator, determining a direction of power flow through the voltage regulator based on the sensed current, determining a verified direction of power flow through the voltage regulator by altering a voltage between the input and the output and analyzing an effect caused thereby on at least one of a voltage at the input and a voltage at the output, and selecting a voltage regulating scheme for controlling the voltage regulator based on the verified direction of power flow.

In another embodiment, a method of controlling a voltage regulator is provided, wherein the voltage regulator includes a first terminal on a first side of the voltage regulator, a second terminal on a second side of the voltage regulator, and a common terminal. The voltage regulator is structured to operate in a forward mode wherein power flows from the first side to the second side and a reverse mode wherein power flows from the second side to the first side. The method includes measuring a first current flowing through the voltage regulator, determining that the first current is not greater than a predetermined reverse current threshold, in response to determining that the first current is not greater than the reverse current threshold, verifying that reverse power is flowing through the voltage regulator based on at least one of a first determined voltage at the first terminal and a first determined voltage at the second terminal, in response to verifying that reverse power is flowing through the voltage regulator, causing the voltage regulator to operate in the reverse mode. The method further includes measuring a second current flowing through the voltage regulator, determining that the second current is not less than a predetermined forward current threshold, in response to determining that the second current is not less than the forward current threshold, verifying that forward power is flowing through the voltage regulator based on at least one of a second determined voltage at the first terminal and a second determined voltage at the second terminal, and in response to verifying that forward power is flowing through the voltage regulator, causing the voltage regulator to operate in the forward mode.

In still another embodiment, a voltage regulator is provided that has a first side and a second side and that is structured to operate in a forward mode wherein power flows from the first side to the second side and a reverse mode wherein power flows from the second side to the first side. The voltage regulator includes a first terminal provided on the first side of the voltage regulator, a second terminal provided on the second side of the voltage regulator, a common terminal, a current sensor, a first winding provided on the first side of the voltage regulator coupled to the first terminal and the common terminal, a second winding provided on the second side of the voltage regulator coupled to the first terminal and the second terminal, a regulating element structured to vary a winding ratio between the first winding and the second winding, and a control unit having a processor and a memory. The control unit is structured to measure a first current flowing through the voltage regulator using the current sensor, cause the voltage regulator to operate in the forward mode if the first current is greater than a reverse current threshold, if the first current is not greater than the reverse current threshold, verify whether or not reverse power is flowing through the voltage regulator by causing the regulating element to vary the winding ratio and monitoring at least one of a first voltage at the first terminal and a second voltage at the second terminal, cause the voltage regulator to operate in the forward mode if it is verified that reverse power is not flowing through the voltage regulator, and cause the voltage regulator to operate in the reverse mode if it is verified that reverse power is flowing through the voltage regulator.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
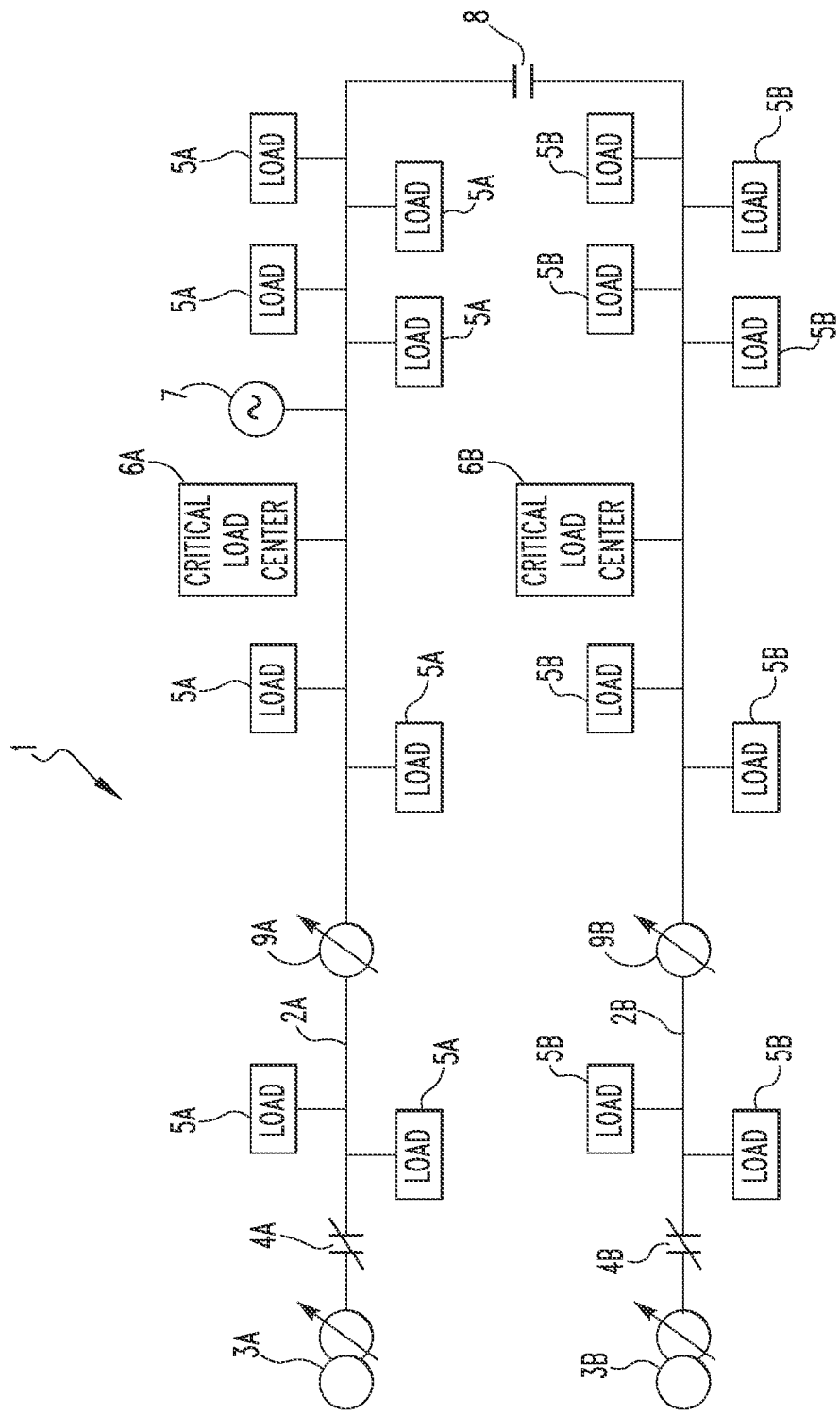
FIG. 1 is a schematic diagram of a prior art electrical distribution system in a normal bus configuration.
Figure 2:
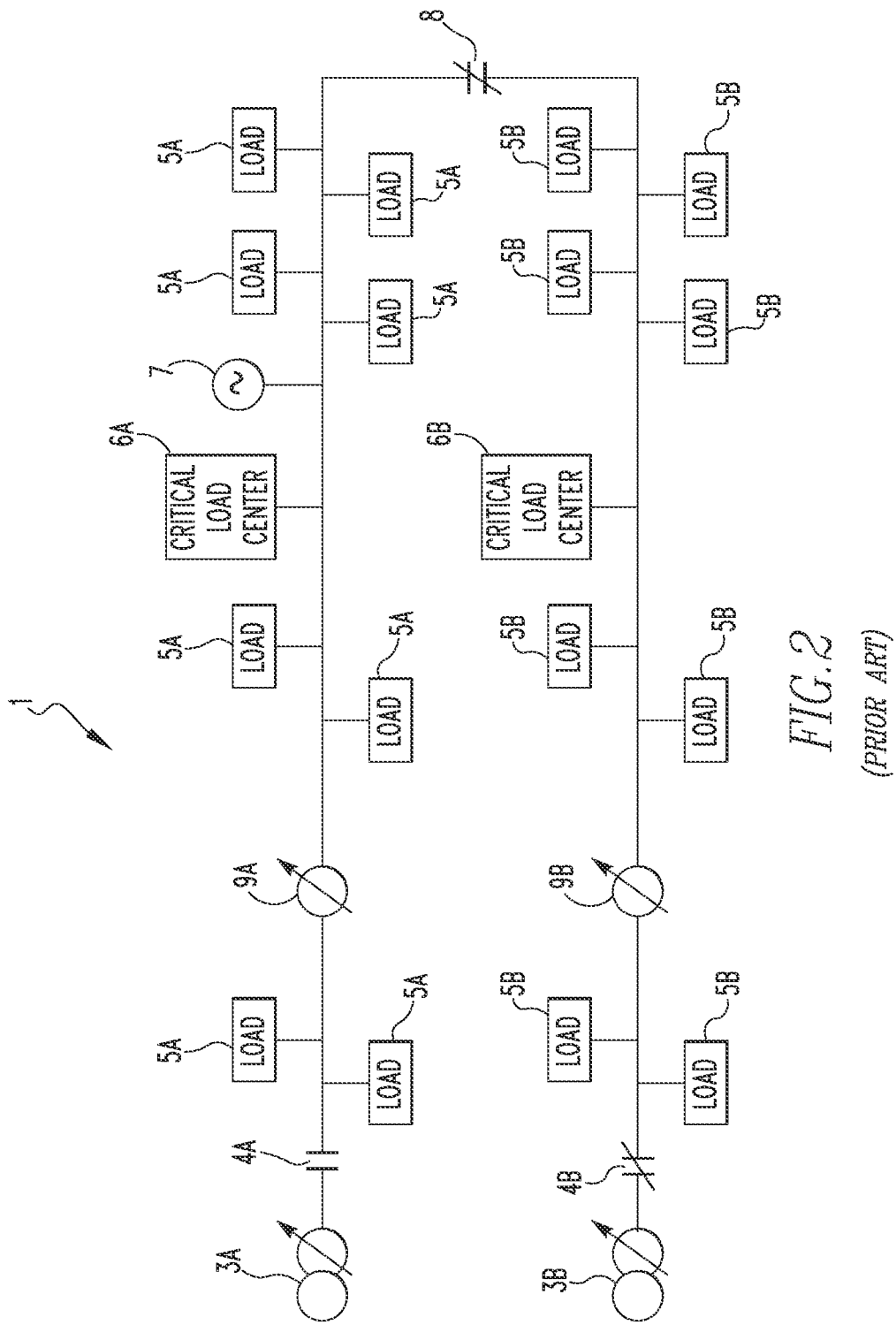
FIG. 2 is a schematic diagram of a prior art electrical distribution system in a back feed bus configuration.

As used herein, the singular form of "a", "an", and "the" include plural references unless the context clearly dictates otherwise.

As used herein, the statement that two or more parts or elements are "coupled" shall mean that the parts are joined or operate together either directly or indirectly, i.e., through one or more intermediate parts or elements, so long as a link occurs.

As used herein, "directly coupled" means that two elements are directly in contact with each other.

As employed herein, the term "number" shall mean one or an integer greater than one (i.e., a plurality).

As used herein, the term "component" is intended to refer to a computer related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As described in greater detail herein, the disclosed concept provides a new mode of operation for a voltage regulator that will allow the control of the voltage regulator to operate in a normal, forward biased cogeneration mode during normal system configuration (with forward power flow direction), but that also has the ability to sense, based on power flow direction and the measured effect of tapping operations on the sensing voltages of the voltage regulator, the reversal of the system configuration to a true reverse power flow direction and, in response thereto, allow the voltage regulator control to switch to an appropriate reverse power flow mode of operation until it can be established that the system configuration has truly switched back to the normal, forward biased cogeneration direction (with forward power flow direction).

Figure 3:
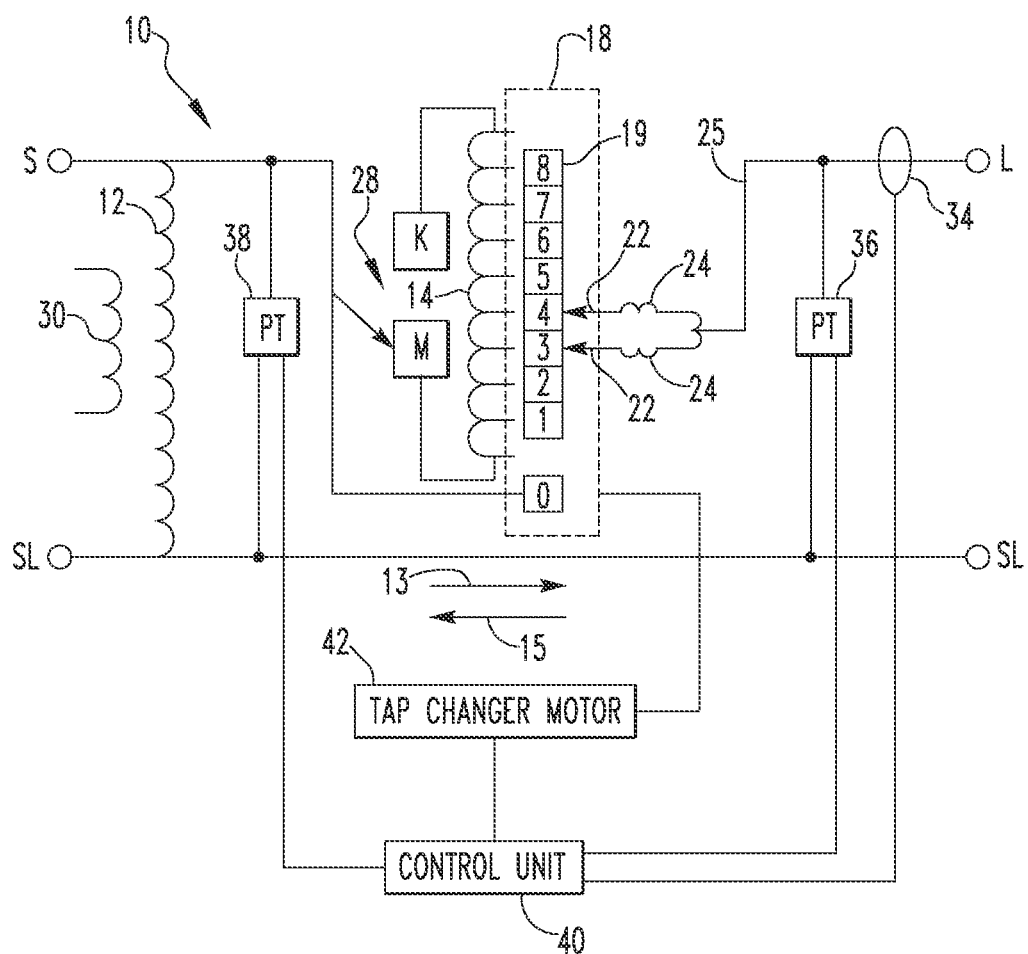
FIG. 3 is a schematic diagram of a voltage regulator according to an exemplary embodiment of the present invention.

FIG. 3 is a schematic diagram of a voltage regulator 10 that is structured to implement the disclosed concept according to one particular, non-limiting exemplary embodiment of the invention. Alternative winding configurations and connections of the voltage regulator to those illustrated here will be understood by those skilled in the art, and who will also appreciate how this invention may be applied to any of these variations. Voltage regulator 10 as described herein may be used in the power distribution system one shown in FIGS. 1 and 2 in place of voltage regulator 9A and/or voltage regulator 9B. As seen in FIG. 3, voltage regulator 10 includes S, L, and SL bushings (or terminals). For forward power flow, voltage is applied to the S and SL bushings and the output voltage is provided across the L and SL bushings. For reverse power flow, voltage is applied to the L and SL terminals and the output voltage is provided across the S and SL bushings.

In the illustrated embodiment, voltage regulator 10 is a "Type A" or "Straight Voltage Regulator" and includes a shunt winding 12 that is disposed between the S and SL bushings, and a series winding 14 that forms an autotransformer with shunt winding 12 and is disposed between the S and L bushings. The series winding 14 is provided with a number of voltage taps for, as described below, controlling the output of voltage regulator 10. Forward power flow though voltage regulator 10 is indicated by arrow 13 and reverse power flow though voltage regulator 10 is indicated by arrow 15. It will be understood, however, that other voltage regulator configurations, such as, without limitation, a "Type B" or "Inverted Voltage Regulator" wherein the shunt winding is between the L and the SL bushings and the series winding is between the S and the L bushings, are also possible within the scope of the present invention.

Referring again to FIG. 3, the output voltage of voltage regulator 10 across the L and SL bushings for forward power flow is controlled by the position of a tap changer 18 through stationary contacts 19 (labeled 0-8) connected to series winding 14. Tap changer 18 further includes moving contacts 22 that are connected to preventative auto transformer 24 (the purpose of which is not relevant to this invention), which in turn is connected to the L bushing through a conductor 25 for supplying the output voltage from voltage regulator 10.

A switch 28 is connected to the S bushing. Switch 28 can be closed through either terminal M or terminal K of secondary winding 14 to change the polarity of the voltage through series winding 14.

A tertiary winding 30 (referred to as a control winding), responsive to the magnetic flux generated by shunt winding 12, supplies power to a control unit 40 and a tap changer motor 42 coupled to and controlled by control unit 40 (for ease of illustration, the electrical connections for such power supply functionality are not shown). As described herein, control unit 40 is structured to enable selectable operation of tap changer 18 to desired positions.

Voltage regulator 10 further includes a current transformer (CT) 34 coupled to the L bushing. In addition, a number of well-known voltage sensing techniques may be applied, including, but not limited to, measuring the voltage across the tertiary winding 30, a potential transformer (PT) 36 coupled across the L and SL bushings, or a potential transformer 38 coupled across the S and SL bushings of voltage regulator 10. Current transformer 34 is coupled to control unit 40 and generates a signal that is indicative of the current flowing to a load through the L bushing. Voltage sensing devices such as the control winding 30, PT 36 or PT 38 may be coupled to control unit 40 for determining the relative voltage at the S and L bushings.

In operation, during forward power flow in the direction indicated by arrow 13, control unit 40 measures the voltage across the L and SL bushings and determines a difference between that voltage and a forward reference set point/ desired voltage. Voltage regulator 10 then controls tap changer 18 to operate the tap changer 18 to reduce this difference within a configured range around the set point. During reverse power flow in the direction indicated by arrow 15, the voltage across the S and SL bushings is measured and a difference between that voltage and a reverse reference set point/desired voltage is determined. The voltage regulator 10 then controls tap changer 18 to reduce this difference within a configured range around the set point.

In the exemplary embodiment, control unit 40 comprises a processor and a memory. The processor may be, for example and without limitation, a microprocessor (μP), a microcontroller, or some other suitable processing device, that interfaces with the memory. The memory can be any one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory has stored therein a number of routines that are executable by the processor to enable operation of voltage regulator 10 as described herein.

Figure 4:
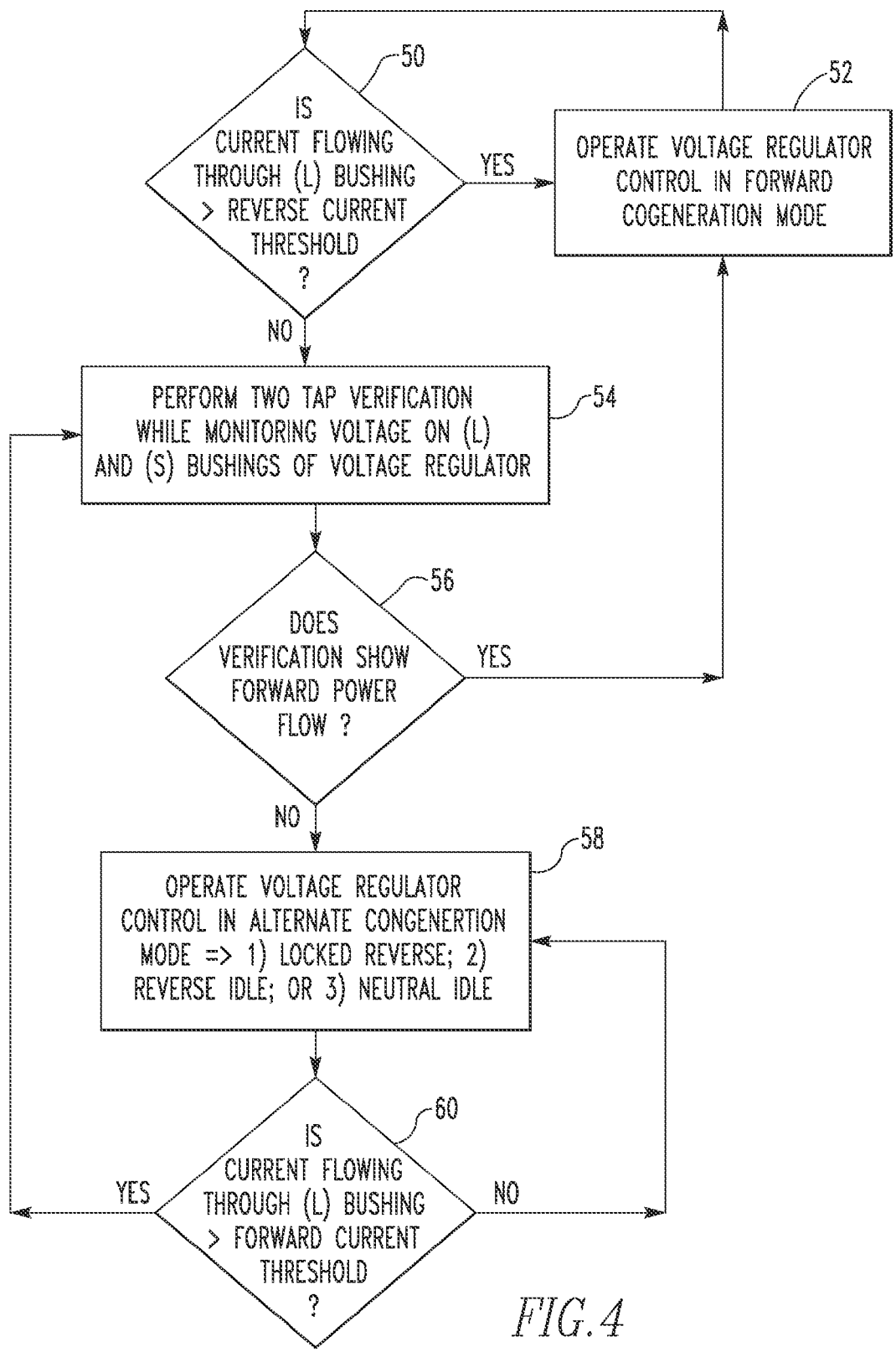
FIG. 4 is a flowchart illustrating a method of controlling a voltage regulator according to an exemplary embodiment of the present invention.

FIG. 4 is a flowchart illustrating a method of operating voltage regulator 10 according to an exemplary embodiment of the disclosed concept. As will be appreciated, the method shown in FIG. 4 will be implemented in one or more routines of control unit 40 of voltage regulator 10. The method of FIG. 4 provides a mechanism for determining when and under what circumstances voltage regulator 10 should be switched from a normal forward biased cogeneration mode of operation to an alternative mode (for instance, reverse locked, neutral idle) of operation and back. As described in detail below, switching to the alternative mode of operation is only permitted when at least a certain level of reverse current is sensed and the reverse direction of power flow is verified using a two tap process. Similarly, switching from the alternative biased cogeneration mode of operation back to the normal, forward biased cogeneration mode of operation is only permitted when at least a certain level of forward current is sensed. Optionally, the forward direction of power flow may be verified using the two tap process prior to switching from the alternative biased cogeneration mode of operation back to the normal, forward biased cogeneration mode.

The method begins at step 50 (voltage regulator 10 is initially in the normal forward biased cogeneration mode), wherein a determination is made as to whether the current flowing through the L bushing (as measured by current transformer 34) is greater than some predetermined reverse current threshold. The predetermined reverse current threshold is a user configurable value that is stored by control unit 40 and that may be adjusted as deemed necessary. In the exemplary embodiment, the reverse current threshold is in the range of −1% to −5% of the current rating of voltage regulator 10. If the answer at step 50 is yes, then the method proceeds to step 52, wherein voltage regulator 10 is controlled to continue to operate in the normal forward biased cogeneration mode. As is known in the art, in this mode of operation, voltage regulator 10 will attempt to regulate the output voltage on the L bushing based upon a forward voltage reference value (e.g. 120 VAC) and a forward voltage band (e.g. 2 V) wherein voltage regulator 10 will make an adjustment using tap changer 18 in the prescribed direction any time the voltage goes "out of band" (e.g., above 121 V or below 119 V) for more than a predetermined time. Following step 52, the method returns to step 50 to continue to monitor the current flowing through the L bushing.

If, however, the answer at step 50 is no, meaning that the current flowing through the L bushing is less than or equal to the reverse current threshold (for example, less than or equal to −1% of the current rating of voltage regulator 10), the method proceeds to step 54. At step 54, a two tap verification procedure is performed while monitoring both the voltage on the L bushing 34 and the voltage on the S bushing in order to determine which side of the voltage regulator has the prevailing system voltage. More specifically, in the two tap verification process, control unit 40 causes tap changer 18 to be driven two taps in one direction, two taps Raise for Low voltage, two taps Lower for High voltage, and the changes, if any, to the voltages on the L bushing and the S bushing are monitored. As described below, the behavior of the L and S bushing voltages in response to the two tap variation will indicate which side of the regulator can be controlled. In particular, if in response to the two tap verification the voltage at the L bushing (i.e., across the L and SL bushings) changes by at least a certain amount, then that indicates that the prevailing system voltage is on the source side of the voltage regulator and voltage regulation should be adjusted as if power flow is in the forward direction. If, however, in response to the two tap verification the voltage at the S bushing (i.e., across the S and SL bushings) changes by at least a certain amount, then that will indicate that the prevailing system voltage is on the load side of the voltage regulator and power flow is in the reverse direction. Thus, at step 56, a determination is made as to whether the two tap verification process of step 54 shows forward power flow. If the answer at step 56 is yes, then the method returns to step 52 and operation in the normal forward biased cogeneration mode is continued. However, if the answer at step 56 is no, meaning that the two tap verification process of step 54 shows reverse power flow, then the method proceeds to step 58.

In step 58, since reverse power flow has been verified, voltage regulator 10 is controlled to operate in an alternative biased cogeneration mode (in other words, operation is switched from normal forward biased cogeneration mode to an alternative biased cogeneration mode). The particular alternative biased cogeneration mode that will be switched to in step 58 will, in the exemplary embodiment, be one of (i) locked reverse mode, or (ii) neutral idle mode. As is known in the art, in locked reverse mode, control unit 40 locks such that voltage regulator 10 only tries to regulate and show metering of the output voltage on the S bushing (reverse direction). In other words, voltage regulator 10 adjusts tap position to minimize the difference between the source voltage and the reverse power flow set point until true forward power flow is sensed as described herein (step 60 below). In neutral idle mode, control unit 40 runs tap changer 18 back to the neutral tap position and idles there until true forward power flow is sensed as described herein (step 60 below).

Following step 58, the method proceeds to step 60, wherein a determination is made as to whether the current flowing through the L bushing, as measured by current transformer 34, exceeds a forward current threshold. In the exemplary embodiment, the forward current threshold is in the range of +1% to +5% of the current rating of voltage regulator 10. If the answer at step 60 is no, then the method returns to step 58 and operation in the alternative biased cogeneration mode is continued. If, however, the answer at step 60 is yes, meaning that the detected current is indicative of forward power flow, then the method returns to step 54 wherein another two tap verification as described herein is performed in order to verify the true direction of current flow. Subsequent operation of voltage regulator 10 will then proceed as indicated by the method steps based on the answer at step 56.

In one particular, non-limiting embodiment, the method of the present invention as shown in FIG. 4 may also allow for the situation were neither the forward or reverse direction of regulation can be positively determined. In such a situation, the method will allow for some prescribed time of idling on the last tap position until control unit 40 will retry the process of determining a needed direction of regulation.

Thus, voltage regulator 10 and the method of operating voltage regulator 10 as described herein provide a mechanism of control of voltage regulator 10 that is capable of accommodating the blending of cogeneration and reverse power flow due to system reconfiguration modes of operation that is based on power flow direction as verified by the effect of tapping operations on the S and/or L bushing voltages.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of controlling a voltage regulator, the voltage regulator including a first terminal on a first side of the voltage regulator, a second terminal on a second side of the voltage regulator, and a common terminal, the voltage regulator being structured to operate in a forward mode wherein power flows from the first side to the second side and a reverse mode wherein power flows from the second side to the first side, the method comprising:
   measuring a first current flowing through the voltage regulator;
   determining that the first current is not greater than a predetermined reverse current threshold;
   in response to determining that the first current is not greater than the reverse current threshold, verifying that reverse power is flowing through the voltage regulator based on at least one of a first determined voltage at the first terminal and a first determined voltage at the second terminal;
   in response to verifying that reverse power is flowing through the voltage regulator, causing the voltage regulator to operate in the reverse mode;
   following the causing the voltage regulator to operate in the reverse mode, measuring a second current flowing through the voltage regulator;
   determining that the second current is not less than a predetermined forward current threshold;
   in response to determining that the second current is not less than the forward current threshold, verifying that forward power is flowing through the voltage regulator based on at least one of a second determined voltage at the first terminal and a second determined voltage at the second terminal; and
   in response to verifying that forward power is flowing through the voltage regulator, causing the voltage regulator to operate in the forward mode.

2. The method according to claim 1, wherein the voltage regulator includes a first winding on the first side of the voltage regulator coupled to the first terminal and the common terminal, a second winding on the second side of the voltage regulator coupled to the first terminal and the second terminal, and a regulating element structured to vary a winding ratio between the first winding and the second winding, wherein the verifying that reverse power is flowing through the voltage regulator based on at least one of a first determined voltage at the first terminal and a first determined voltage at the second terminal comprises varying the winding ratio and observing a change in the first determined voltage at the first terminal in response thereto, and wherein the verifying that forward power is flowing through the voltage regulator based on at least one of a second determined voltage at the first terminal and a second determined voltage at the second terminal comprises varying the winding ratio and observing a change in the second determined voltage at the second terminal in response thereto.

3. The method according to claim 2, wherein the voltage regulator is a Type A voltage regulator, wherein the first terminal is an S bushing, the second terminal is an L bushing, the common terminal is an SL bushing, the first winding is a shunt winding, and the second winding is a series winding.

4. The method according to claim 3, wherein the series winding includes a plurality of taps and wherein the regulating element comprises a tap changer coupled to the series winding.

5. The method according to claim 4, wherein the winding ratio is varied by causing the tap changer to move a contact a number of taps along the series winding.

6. The method according to claim 2, wherein the change in the first determined voltage at the first terminal is a change having at least a first predetermined magnitude and wherein the change in the second predetermined voltage at the second terminal is a change having at least a second predetermined magnitude.

7. The method according to claim 1, wherein the voltage regulator includes a current transformer coupled to the second terminal and structured to measure the first and second currents.

8. The method according to claim 1, wherein the voltage regulator includes a first potential transformer structured to measure the first and second determined voltages at the second terminal and a second potential transformer structured to measure the first and second determined voltages at the first terminal.

9. The method according to claim 1, wherein the forward mode is a forward biased cogeneration mode and wherein the reverse mode is one of a locked reverse mode or a neutral idle mode.

10. A voltage regulator having a first side and a second side and being structured to operate in a forward mode wherein power flows from the first side to the second side and a reverse mode wherein power flows from the second side to the first side, comprising:
 a first terminal provided on the first side of the voltage regulator;
 a second terminal provided on the second side of the voltage regulator;
 a common terminal;
 a current sensor;
 a first winding provided on the first side of the voltage regulator coupled to the first terminal and the common terminal;
 a second winding provided on the second side of the voltage regulator coupled to the first terminal and the second terminal;
 a regulating element structured to vary a winding ratio between the first winding and the second winding; and
 a control unit having a processor and a memory, the control unit being structured to:
  measure a first current flowing through the voltage regulator using the current sensor;
  cause the voltage regulator to operate in the forward mode if the first current is greater than a reverse current threshold;
  if the first current is not greater than the reverse current threshold, verify whether or not reverse power is flowing through the voltage regulator by causing the regulating element to vary the winding ratio and monitoring at least one of a first voltage at the first terminal and a second voltage at the second terminal;
  cause the voltage regulator to operate in the forward mode if it is verified that reverse power is not flowing through the voltage regulator; and
  cause the voltage regulator to operate in the reverse mode if it is verified that reverse power is flowing through the voltage regulator.

11. The voltage regulator according to claim 10, wherein the control unit is further structured to, after the control unit causes the voltage regulator to operate in the reverse mode:
 measure a second current flowing through the voltage regulator using the current sensor;
 cause the voltage regulator to operate in the reverse mode if the second current is less than a forward current threshold;
 if the second current is not less than the forward current threshold, verify whether or not forward power is flowing through the voltage regulator by causing the regulating element to vary the winding ratio and monitoring at least one of the first voltage at the first terminal and the second voltage at the second terminal;
 cause the voltage regulator to operate in the reverse mode if it is verified that forward power is not flowing through the voltage regulator; and
 cause the voltage regulator to operate in the forward mode if it is verified that forward power is flowing through the voltage regulator.

12. The voltage regulator according to claim 10, wherein the control unit is further structured to, after the control unit causes the voltage regulator to operate in the reverse mode:
 measure a second current flowing through the voltage regulator using the current sensor;
 cause the voltage regulator to operate in the reverse mode if the second current is less than a forward current threshold;
 if the second current is not less than the forward current threshold, cause the voltage regulator to operate in the forward mode.

13. The voltage regulator according to claim 10, wherein the voltage regulator is a Type A voltage regulator, wherein the first terminal is an S bushing, the second terminal is an L bushing, the common terminal is an SL bushing, the first winding is a shunt winding, and the second winding is a series winding.

14. The voltage regulator according to claim 10, wherein the control unit is structured to verify that reverse power is not flowing through the voltage regulator when the second voltage at the second terminal changes in response to the winding ratio varying, and wherein the control unit is structured to verify that reverse power is flowing through the voltage regulator when the first voltage at the first terminal changes in response to the winding ratio varying.

15. The voltage regulator according to claim 10, wherein the control unit is structured to verify that reverse power is not flowing through the voltage regulator when the second voltage at the second terminal changes at least a predetermined amount in response to the winding ratio varying, and wherein the control unit is structured to verify that reverse power is flowing through the voltage regulator when the first voltage at the first terminal changes at least a predetermined amount in response to the winding ratio varying.

16. The voltage regulator according to claim 13, wherein the series winding includes a plurality of taps and wherein the regulating element comprises a tap changer (18) coupled to the series winding.

17. The voltage regulator according to claim 16, wherein the control unit varies the winding ratio by causing the tap changer to move a contact a number of taps along the series winding.

18. A voltage regulator having a nominal input and a nominal output structured to operate in a forward power mode wherein power flows from the input to the output and a reverse power mode wherein power flows from the output to the input, comprising:
   means for sensing current flowing through the voltage regulator;
   means for altering a voltage between the input and the output;
   means for determining the voltage at the input and output; and
   a control unit structured to:
      determine a direction of power flow through the voltage regulator using at least the current sensing means;
      determine a verified direction of power flow through the voltage regulator by adjusting the voltage altering means and analyzing an effect caused thereby one or more voltages measured by the voltage determining means;
      select a voltage regulating scheme based on the verified direction of power flow.

19. The voltage regulator according to claim 18, wherein the voltage altering means includes a first winding coupled to the input, a second winding coupled to the output and a tap changer coupled to the second winding.

20. A method of controlling a voltage regulator having a nominal input and a nominal output structured to operate in a forward power mode wherein power flows from the input to the output and a reverse power mode wherein power flows from the output to the input, the method comprising:
   sensing current flowing through the voltage regulator;
   determining a direction of power flow through the voltage regulator based on the sensed current;
   determining a verified direction of power flow through the voltage regulator by altering a voltage between the input and the output and analyzing an effect caused thereby on at least one of a voltage at the input and a voltage at the output; and
   selecting a voltage regulating scheme for controlling the voltage regulator based on the verified direction of power flow.

* * * * *